United States Patent [19]

Penoza et al.

[11] Patent Number: 4,475,850

[45] Date of Patent: Oct. 9, 1984

[54] SPLIT HELIX ROUTER BIT

[76] Inventors: Frank J. Penoza, 2639 W. Robino Dr., Wilmington, Del. 19808; Thomas F. Penoza, 215 Sterling Ave., New Castle, Del. 19720

[21] Appl. No.: 290,776

[22] Filed: Aug. 16, 1981

[51] Int. Cl.³ .............................................. B26D 1/12
[52] U.S. Cl. ........................................ 407/54; 407/53; 408/229
[58] Field of Search .................... 407/53, 54; 408/229, 408/22, 26; 144/218; 145/130

[56] References Cited

U.S. PATENT DOCUMENTS

| | | | |
|---|---|---|---|
| 121,059 | 11/1871 | Moeller et al. | 144/218 |
| 1,630,602 | 5/1927 | Blanco | 408/224 |
| 2,778,252 | 1/1957 | Oxford | 408/230 |
| 3,749,189 | 7/1973 | Boehm | 408/230 |
| 3,913,196 | 10/1975 | Maday | 407/54 |
| 4,227,837 | 10/1980 | Yodoshi | 407/53 |
| 4,274,771 | 6/1981 | Nishimura | 408/230 |
| 4,338,050 | 7/1982 | Ozer et al. | 407/53 X |
| 4,395,167 | 7/1983 | Maternus | 407/54 |

Primary Examiner—William R. Briggs
Assistant Examiner—Lawrence Meier
Attorney, Agent, or Firm—John G. Abramo

[57] ABSTRACT

A router especially adapted for cutting plastic fibrous materials cleanly. The router design is a cylindrical body having two sets of cutting edges extending the full length of the bit except for the shank. The cutting edges are helically oriented along the shaft of the router and one set of cutting edges extends helically right-handed while the other set of the cutting edges extends helically left-handed. The two cutting edges are separated by a pair of flutes or grooves diametrically opposed to each other. The cutting edges are also diametrically opposed to each other along the shaft of the cylinder. The router bit is used to trim plastic laminated materials reinforced with fibers.

8 Claims, 10 Drawing Figures

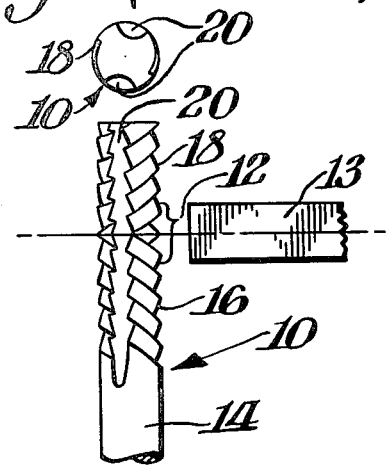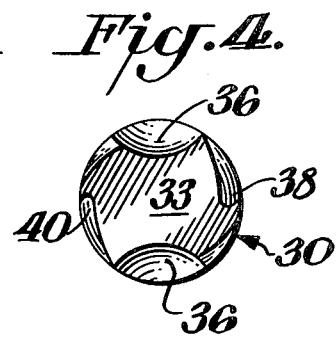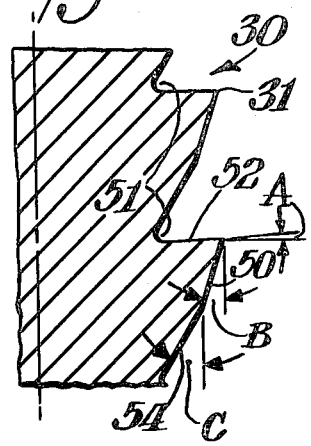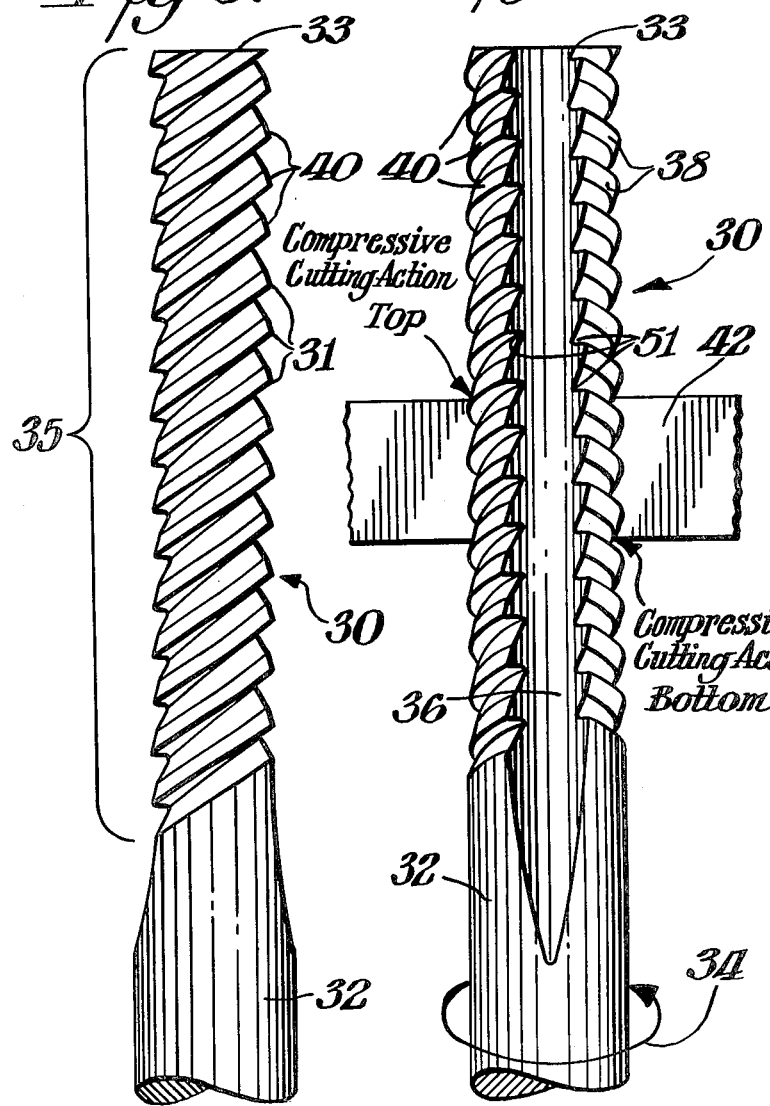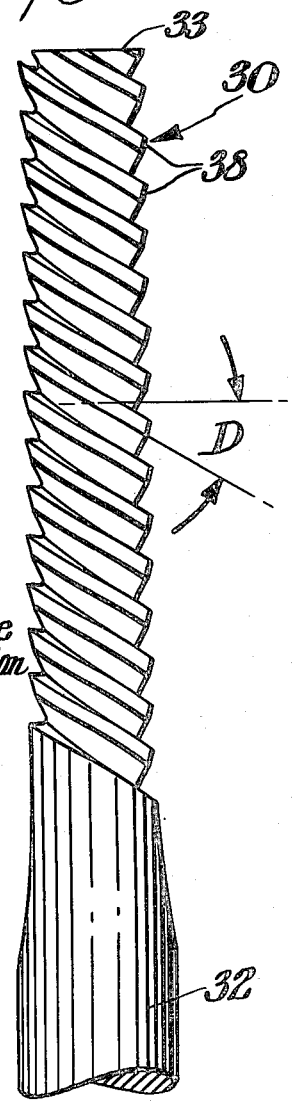

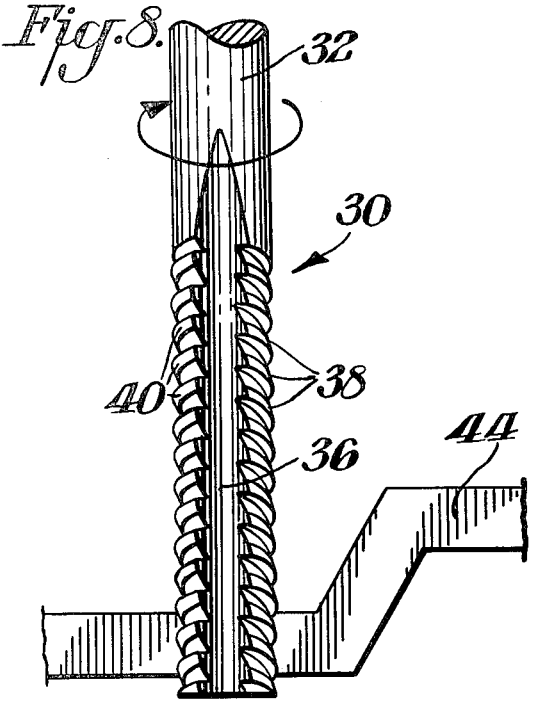
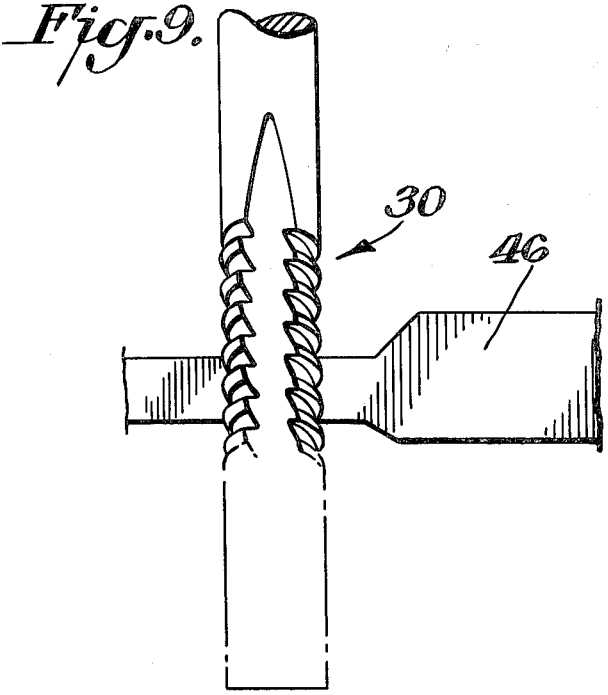
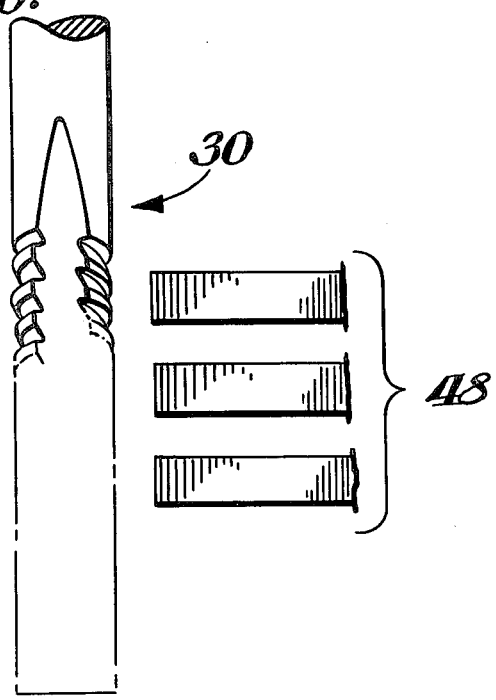

SPLIT HELIX ROUTER BIT

BACKGROUND OF THE INVENTION

The shaping of plastic articles and plastic laminated articles as well as wood and other construction materials is well known in the art.

The following list involves a number of prior art devices which have been used for shaping materials.

Rendall, U.S. Pat. No. 335,309—Cutter Head—Describes a cutter head for cutting down trees or other structures in which the cutting teeth are aligned in a spiral around a shaft and the chisel-like teeth on the spiral are rotated by the shaft and chop out the material being cut. A configuration is described for one modification in which there are two spiral configurations to the teeth; one running in one direction and the other the opposite direction on the shaft so that wood chips being formed are thrown outward from the area being trimmed.

Blanco, U.S. Pat. No. 1,630,602—Reamer—Describes a tapered reaming tool having four sets of teeth which are alternately aligned upward cutting and downward cutting for the purposes of cleaning up and/or shaping the bore of an already drilled hole "without the necessity of turning the reamer at an excessive speed." The reamer is not used to trim the edges of flat pieces and is designed to fit inside a bored hole to smooth and enlarge the interior walls of the hole.

Compton, U.S. Pat. No. 2,623,553—Side Cutting Rotary Tool—Describes a rotatable bit for rapid side cutting having a longitudinal groove with cutting teeth located on the edge of the groove. The device is designed to drill a hole and then to be used to cut or scroll sideways.

Cave, U.S. Pat. No. 3,058,199—Cutting Tool—Describes a bit having a spiral groove from the cutting point to the shank end and teeth protruding from the cylinder of the bit to provide rasping or abrasive force on the side of a drilled hole. The tool is especially designed for cutting and shaping plastic. The teeth provide for abrasion of plastic material while providing the maximum cooling which is required because plastics soften with heat.

Hunn, U.S. Pat. No. 3,327,749—Transverse Cutting Rotary Tool Bit—Describes a bit having a plurality of longitudinal grooves which is designed first to drill a hole and thereafter to make a transverse cut. The transverse cutting action is facilitated by the staggered configuration of teeth located along the length of the bit.

Maday, U.S. Pat. No. 3,913,196—Rotary Cutting Tool—Describes a router tool for trimming and cutting plastic materials that may fray if cut with other routing bits. The cutting edges are two pairs of opposed helical cutting edges, one pair starting on the shank of the bit and the other pair at the drilling end of the bit, each of which meets in the middle of the bit shaft. Each of the helical cutting edges terminate at the middle of the bit which is also the working center of the bit. Materials to be cut must be centered on the working center of the bit so that when the tool is rotated, the cutting edges on opposite sides of the working center are opposed in their spiral direction. They cut the material with a cutting action in which the top and bottom helical cutting edges cooperate to simultaneously apply a compressive cutting force to the edge of the material being trimmed.

As is indicated by Maday, most plastics can be trimmed or cut with conventional routing tools but laminated material containing fabric reinforcements present problems. Composite laminates made with high strength fibers are particularly difficult to machine or trim along their edges without generating a fuzzy, frayed-looking edge. Maday has provided one type of such drill in U.S. Pat. No. 3,913,196. However, as mentioned above, his cutting tool requires that the piece being worked be centered at the center of the working zone of the tool in order to trim the edges and obtain a fuzzy-free edge. If the piece is not properly aligned to engage the working center or, as he calls it, the zone of confrontation, then the compressive action from above is not engaged.

SUMMARY OF THE INVENTION

A split helical router bit having a shaft end adapted to be attached to driving means, a cutting zone made up of at least one set or right-handed helical cutting edges and at least one set of left-handed helical cutting edges, said helical cutting edges extending the length of the cutting zone and having at least two flutes separating the helical cutting edges and extending the length of the cutting zone. The helical cutting edges have a leading face that forms an angle from 0 to 3 degrees positive hook perpendicular to the cylinder axis, a primary clearance land which can vary from 5 to 45 degrees relative to the cylindrical axis, a secondary clearance land that can vary from 10 to 60 degrees relative to the cylindrical axis and the helical cutting teeth are aligned 5 to 45 degrees perpendicular to the cylindrical axis. There can be from 5 to 20 cutting edges per inch along the length of the cutting zone. The flute functions to separate the helical cutting edges and also to provide a space for shavings to fall away from the material being trimmed.

BRIEF DESCRIPTION OF THE DRAWINGS

FIG. 1 is a front elevational view showing a router bit of the prior art;

FIG. 2 is a top plan view showing the router bit of the prior art set out in FIG. 1;

FIG. 3 is a front elevational view showing the router bit of this invention;

FIG. 4 is a top plan view of the router bit shown in FIG. 3;

FIG. 5 is a left side elevational view of the router bit shown in FIGS. 3-4;

FIG. 6 is a right side elevational view of the router bit shown in FIGS. 3-5;

FIG. 7 is an enlarged cross-sectional view in elevation showing the primary and secondary cutting edge of the router bit;

FIG. 8 is a rear elevational view of the router bit shown in FIGS. 3-7 cutting laminate with a change in elevation of the laminate structure;

FIG. 9 is a rear elevational view of the router bit shown in FIGS. 3-7 cutting laminate of varying thickness; and FIG. 10 is a rear elevational view of the router bit shown in FIGS. 3-7 cutting laminate of several layers.

DETAILED DESCRIPTION OF THE INVENTION

Referring now to FIGS. 1 and 2, the prior art device described in the Maday patent referred to above, a rotary cutting tool 10 is shown with a piece of laminate material 13 oriented in the zone of confrontation 12. Shown are helical cutting edges 18 located above the zone of confrontation and helical cutting edges 16 located below the zone of confrontation. The shank 14 connects to driving means which rotates the cutting tool 10 thereby applying the cutting action to the laminate 13. The ends of two flutes 20 are shown in FIG. 2 and they extend most of the length of the bit as shown in FIG. 1. The Maday patent states that the laminate 13 to be trimmed must be centered on the zone of confrontation 12 in order for that device to operate because the cutting edges 16 and 18 of the tool simultaneously apply a compressive cutting force to the laminate 13.

The term "split helix" as applied to the present invention disclosed herein is used to indicate that the helical configuration of the cutting edges are interrupted by flute 36. In the present invention, there are two sets of cutting edges which are interrupted by flutes 36. If the cutting edges were not interrupted by flutes and were present on separate cylinders, they would be in the form of helix. The cutting edges that spirals toward the end of the bit 33 is designated a left-hand helix. The other cutting edge spirals from the end of the bit 33 toward the shaft is designated a right-hand helix.

Referring now to the figures, the split helix router bit 30 of the present invention has, as is shown in FIG. 4, two flutes 36 extending from the shank 32 to the end of the bit 33. In FIG. 6, the left-hand helical cutting edges 38 are shown with the spiral direction from the shank 32 toward the end of the bit 33. In FIG. 5, the right-hand helical cutting edges 40 are shown in the opposite direction, that is, from the end 33 toward the shank 32.

In FIG. 3, the bit rotation is indicated by the arrow 34 and a laminated piece to be cut 42 is placed opposite of the bit 30. The compressive cutting action is applied to the piece 42 alternately from the top and bottom. The right-hand helical cutting edges 40 provide a compressive cutting action from the top while the left-hand helical cutting edges 38 provide a compressive cutting action from the bottom. As is evident from the drawings, the cutting action is applied to the bottom or the top of the laminate structure 43 alternately as the bit 30 turns. The flutes 36, in addition to interrupting the helix cutting edges 36 and 38, also allow cuttings to fall away from the bit.

In FIG. 6, the left helical cutting edges 38 are shown cut into the cylinder of the bit at an angle D. The angle D is preferably about 30 degrees but some variation is acceptable and within the scope of the invention. The right-hand cutting edges 36 are cut at the same angle D.

Referring to FIG. 7, the bit 30 is shown in cross-sectional detail. The leading face 52 of the helical cutting edges 40 and 38 forms an angle A with the cylinder of the routing bit 30. The angle A can vary from zero to three degrees positive hook perpendicular to the vertical axis of the bit. The point 31 is the actual cutting edge that comes in contact with the material to be trimmed. The leading face 52 extends from the point 31 to the gullet 51. The primary clearance land 50 has an angle B as shown in the drawing. The angle B is 20 degrees but can range from 5 to 45 degrees without departing from the scope of the invention. There is also secondary clearance land 54 which has an angle C associated with it as shown in FIG. 7. Angle C is preferably 30 degrees but can vary from 10 to 60 degrees.

Preferably, the angles A, B, C, and D will be 3 degrees, 20 degrees, 30 degrees and 30 degrees, respectively.

The bit 30 has a cutting zone 35 and a shaft 32. There are preferably 12 cutting edges 36 or 38 per inch in the cutting zone 35, but there can be from 5 to 20 cutting edges per inch without departing from the scope of this invention.

The bit of this invention will trim laminate anywhere along its length so long as the laminate material is not longer than the length of the cutting zone which encompasses the helical cutting edges on the bit 30. It is evident from the drawings that the bit 30 is preferably aligned at right angles to the material. It is also possible, as shown in the drawings, to cut materials of variable thicknesses as shown by the laminate 46 in FIG. 9 and as shown in FIG. 10 that several layers of laminate 48 can be accomodated along the bit so long as the laminates are positioned approximately at right angles to the bit.

The bits of this invention can be from $\frac{1}{8}$ to $\frac{3}{4}$ inch in diameter, but usually, bits of $\frac{1}{4}$ inch in diameter are most commonly used. The bit length can be from 1 inch to 8 inches but $2\frac{1}{2}$ inches is usually the most convenient length. Materials of construction for the bit are cemented tungsten carbide or high quality ferrous materials. The bit is rotated somewhere between 10,000 and 35,000 R.P.M. when in use to trim laminated materials.

Preferably, the bit has two flutes 36. However, when the bit is larger than one-quarter of an inch in diameter, additional flutes could be incorporated on the bit and still obtain effective cutting action. When more than two flutes are to be incorporated on the bit an even number of flutes such as 4 should be used so that the direction of each cutting edge can be alternated from right to left-hand helical cutting edge.

What is claimed is:

1. A split helical router comprising a cylindrical shaft having a shaft end adapted to engage driving means, said router utilized for high speed cutting of laminated materials in a direction substantially at a right angle to the cylindrical axis, a cutting zone containing at least one set comprising a plurality of uniform overlapping right-handed helical cutting edges and at least one set comprising a plurality of uniform overlapping left-handed helical cutting edges, said cutting edges being inclined at an angle of 25 to 35 degrees relative to the cylindrical axis of the router shaft, and said cutting edges having a substantially uniform outside diameter along the full length of the cutting zone, and more than one flute wherein the flutes separate the helical cutting edges and also extend the length of the cutting zone and are parallel to the cylindrical axis of the router shaft.

2. A bit as in claim 1 in which the helical cutting edges are aligned at an angle of 5 to 55 degrees relative to the cylindrical axis of the bit.

3. A bit as in claim 1 in which the leading face of the helical cutting edges has an angle of 0 to 3 degrees positive hook perpendicular to the vertical axis of the bit.

4. A bit as in claim 1 in which the angle of the primary clearance land of the helical cutting edges is 5 to 45 degrees relative to the cylindrical axis of the bit.

5. A bit as in claim 1 in which the angle of the secondary clearance land of the cutting edges is 10 to 60 degrees relative to the cylindrical axis of the bit.

6. A bit as in claim 1 wherein there are 5 to 20 cutting edges per inch.

7. A bit as in claim 1 which is from one-eighth inch to three-fourth inch in diameter and from one to eight inches in length.

8. A bit as in claim 1 in which the helical cutting edges are aligned at an angle of 30 degrees, the leading face of the helical cutting edges has an angle of 3 degrees positive hook, a primary clearance land of 30 degrees and a secondary clearance land of 30 degrees and in which there are 12 helical cutting edges per inch along the length of the cutting zone and the bit is one-quarter inch in diameter and two and one-half inches in length.

* * * * *